(12) United States Patent
Uwechue (10) Patent No.: US 8,627,721 B2
(45) Date of Patent: Jan. 14, 2014

(54) ACCELEROMETER BASED ON THE MEASUREMENT OF CASIMIR FORCE FLUCTUATIONS

(75) Inventor: Okechukwu Aniemeka Uwechue, Coral Springs, FL (US)

(73) Assignee: BlackBerry Limited, Waterloo (CA)

( * ) Notice: Subject to any disclaimer, the term of this patent is extended or adjusted under 35 U.S.C. 154(b) by 603 days.

(21) Appl. No.: 12/906,601

(22) Filed: Oct. 18, 2010

(65) Prior Publication Data

US 2012/0095721 A1 Apr. 19, 2012

(51) Int. Cl.
*G01P 15/09* (2006.01)

(52) U.S. Cl.
USPC .................................. 73/514.34; 73/514.06

(58) Field of Classification Search
USPC ..................... 73/514.34, 514.06, 514.32, 105
See application file for complete search history.

(56) References Cited

U.S. PATENT DOCUMENTS 5,095,752 A * 3/1992 Suzuki et al. .............. 73/514.32
6,742,380 B2 * 6/2004 Johnston ....................... 73/1.89

OTHER PUBLICATIONS

Philippe Andreucci, et al; "Impact of Casimir force on nano accelerometers modeling"; 2006, 5th IEEE Conference on Senstors; Oct. 1, 2006, pp. 1057-1060; XP031083201.
Bilhaut L., et al.; "Assessment of nanosystems for space applications," ACTA Astronautica, Pergamon Press, Elmsford, GB; vol. 65, No. 9-10; Nov. 1, 2009; pp. 1272-1283 XP026557987.
EESR, European Patent App. No. 10187849.4; dated Dec. 29, 2010.
Oilier, E. Duraffourg, L. Delaye, M.T. Grange, H. Deneuville, S. Bernos, J. Dianoux, R. Marchi, F. Renaud, D. Baron, T. Andreucci, P. Robert, P., NEMS Devices for Accelerometers Compatible with Thin SOI Technology, Proceedings for the 2nd IEEE International Conference on Nano/Micro Engineered and Molecular Systems, pp. 180-185, Jan. 16-19, 2007.
Wikipedia—Piezoelectric accelerometer, http://en.wikipedia.org/wiki/Piezoelectric_accelerometer, Apr. 6, 2008.
Bo Li, Wendong Zhang, Bin Xie, Chenyang Xue and Jijun Xiong, Development of a novel GaAs micromachined accelerometer based on resonant tunneling diodes, Oct. 30, 2007.
Jerry W. Decker, Electricity from Casimir pressures, Aug. 9, 1999.
Jon Cartwright, "Casimir force learns to swim", http://physicsworld.com/cws/article/news/30172, Jun. 6, 2007.
Oilier, E., Duraffourg, L., Colinet, E., Durand, C., Renaud, D., Royet, A., Renaux, P., Casset, F., Robert, P. , "Lateral MOSFET transistor with movable gate for NEMS devices compatible with "In-IC" integration", Proceedings for the 3rd IEEE International Conference on Nano/Micro Engineered and Molecular Systems, pp. 764-769, Jan. 6-9, 2008.

(Continued)

*Primary Examiner* — John Chapman, Jr.
(74) *Attorney, Agent, or Firm* — Novak Druce Connolly Bove + Quigg LLP (57) ABSTRACT

An accelerometer based on the measurement of Casimir force fluctuations is described. The accelerometer comprises a sealed housing containing a vacuum or a liquid, a piezoelectric plate fixed with the sealed housing, and a mass moveable within the sealed housing located in proximity to the piezoelectric plate. The moveable mass and the piezoelectric plate each have conductive surfaces which are located from each other at a distance which creates a Casimir Effect between the movable mass and the piezoelectric plate. Fluctuations in acceleration of the moveable mass cause fluctuations in the Casimir force on the piezoelectric plate. The acceleration fluctuations cause fluctuations in an electric output of the piezoelectric plate. The fluctuations in electric output are measured and used to calculate an acceleration and direction of movement of the accelerometer or a host device in which the accelerometer is carried.

26 Claims, 5 Drawing Sheets

(56) References Cited

OTHER PUBLICATIONS

PI (Physik Instrumente) GmbH & Co. KG, Piezo-University, http://www.physikinstrumente.com/en/products/prdetail.php?sortnr=400715 Jun. 29, 2008.

J. N. Munday, Federico Capasso and V. Adrian Parsegian, Measured long-range repulsive Casimir—Lifshit Forces, Nature, vol. 457, Jan. 8, 2009, http://environment.harvard.edu/docs/faculty_pubs/capasso_measured.pdf.

Ronald G. Polcawich*, Cheng-Ning Feng, Stewart Kurtz*, Steve Perini, Paul J. Moses, Susan, Trolier-McKinstry, "AC and DC Electrical Stress Reliability of Piezoelectric Lead Zirconate Titanate (PZT) Thin Films", The International Journal of Microcircuits and Electronic Packaging, vol. 23, No. 1, First Quarter 2000.

Mariangela Lisanti, Davide Iannuzzi, and Federico Capasso, Observation of the skin-depth effect on the Casimir force between metallic surfaces, http://www.pnas.org/content/102/34/11989.full, Jul. 5, 2005.

Unknown Author, Casimir effect, http://www.daviddarling.info/encyclopedia/C/Casimir.html, Apr. 4, 2008.

Office Action mailed Jun. 20, 2013, in corresponding Canadian patent application No. 2,755,851.

* cited by examiner

ACCELEROMETER BASED ON THE MEASUREMENT OF CASIMIR FORCE FLUCTUATIONS

TECHNICAL FIELD

The present disclosure relates to accelerometers, and in particular to accelerometers based on the measurement of Casimir force fluctuations.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smartphones are generally intended for handheld use and ease of portability. Smaller devices are generally desirable for portability. Portable electronic devices frequently include accelerometers for use in various device functions. Conventional accelerometers utilize a bulk mass which presses on a piezoelectric material or otherwise exerts a force on the piezoelectric material. The force exerted on the piezoelectric material causes a charge to be generated by the piezoelectric material which is proportional to the acceleration of the mass. By measuring the charge output, acceleration can be calculated when the ratio of charge to acceleration is known. While effective, there remains a need for more sensitive accelerometers which are sensitive to smaller accelerations for use devices.

BRIEF DESCRIPTION OF THE DRAWINGS

Like reference numerals are used in the drawings to denote like elements and features.

DETAILED DESCRIPTION OF EXAMPLE EMBODIMENTS

The present disclosure describes an accelerometer based on the measurement of Casmir force fluctuations. This provides an alternative way to construct a one, two or three-axis piezoelectric accelerometer rather than conventionally using a bulk mass pressing on a piezoelectric material. The accelerometer construction described herein is expected to be far more sensitive to smaller accelerations than traditional piezoelectric accelerometers. The accelerometer operates by measuring fluctuations in the quantum-mechanical forces generated via the Casimir Effect on microstructures. The Casimir Effect is a phenomenon which occurs between parallel conducting surfaces, such as parallel conducting plates, that are brought into extremely close proximity to each other, typically in the order of atomic distances or microns (µm). The Casimir Effect manifests as an attractive force between the parallel conducting surfaces when in a vacuum. In contrast, the Casimir Effect manifests as a repulsive force between the two parallel conducting surfaces having different dielectric permittivity constants when immersed in certain fluids. The attractive force or repulsive force of the Casimir Effect arises from the inequality in the field radiation pressure on either side of the parallel conducting surfaces in such a close configuration.

When immersed in a vacuum, the only electromagnetic modes that can exist within the plate gap are those fluctuations possessing integer multiples of half a wavelength since the boundary conditions for a very good conductor dictate that the electric field be zero everywhere on the plate surfaces. Due to the presence of far fewer modes between the inner surfaces, the radiation pressure on the inside surfaces of such closely-positioned plates is far less than the corresponding pressure on the outside surfaces of the plates (far more modes can exist here), hence a net inward (attractive) force will manifest on the parallel conducting plates.

The Casimir Force ($F_c$) equation is defined as follows:

$$\text{pressure} = F_c/A = hc_0\pi/480d^4 \qquad (1)$$

where A is the area of metal plates (m$^2$), h is Planck's Constant (6.626×10$^{-34}$ Js), $c_0$ is the vacuum speed of light (2.998×10$^8$ ms$^{-1}$) and d is distance between the parallel conducting plates (m).

The present disclosure describes an accelerometer comprising a sealed housing containing a vacuum or a liquid, a piezoelectric plate fixed with the sealed housing, and a mass moveable within the sealed housing located in proximity to the piezoelectric plate. The moveable mass and the piezoelectric plate each have conductive surfaces which are located from each other at a distance which creates a Casimir Effect between the movable mass and the piezoelectric plate. Fluctuations in acceleration of the moveable mass cause fluctuations in the Casimir force on the piezoelectric plate. The acceleration fluctuations cause fluctuations in an electric output of the piezoelectric plate. The fluctuations in electric output are measured and used to calculate an acceleration and direction of movement of the accelerometer or a host device in which the accelerometer is carried. The use of two piezoelectric plates, one on either side of the mass along an axis allows acceleration in opposite directions along that axis to be measured. By using two pairs of piezoelectric plates along orthogonal axes, each pair having a plate on either side of the mass, a two-axis accelerometer for measuring two-dimensional acceleration may be provided. By using a second moveable mass attached in a direction orthogonal to the first moveable mass, and another piezoelectric plate on either side of the second mass on a third axis, a three-axis accelerometer for measuring three-dimensional acceleration may be provided.

In accordance with one embodiment, there is provided an accelerometer, comprising: a sealed housing having an interior surface which defines a cavity; a piezoelectric sensor located within the sealed housing, the piezoelectric sensor comprising a piezoelectric plate rigidly attached to the interior surface of the sealed housing and having a conductive surface having a first dielectric permittivity; a mass located within the sealed housing and having a conductive surface having a second dielectric permittivity, the mass being attached to the interior surface of the sealed housing in proximity to the conductive surface of the piezoelectric plate to produce a Casimir effect which causes a proportional force to be exerted on the piezoelectric plate when the mass accelerates.

In some embodiments, the accelerometer further comprises an amplifier configured to amplify the electrical output received from the piezoelectric plate. The accelerometer may further comprise a processor configured to calculating acceleration based on electrical output from the one piezoelectric plate. The accelerometer may further comprise wherein the piezoelectric plate operates in transverse mode and electrical contacts for the voltage detection circuitry are connected to the piezoelectric plate at opposite sides of the piezoelectric plate, perpendicular to the conductive surface of the piezoelectric plate.

In some embodiments, the first mass is a cuboid. In other embodiments, the accelerometer the first mass is a cylinder and the piezoelectric plate is oriented parallel to a longitudinal axis of the cylinder. In some embodiments, the entire surface of the first mass is gold-plated to provide the conductive surface.

In some embodiments, the piezoelectric plate is attached to the interior surface of the sealed housing by two or more anchor rigid arms, wherein the piezoelectric plate is attached to the interior surface of the sealed housing by two or more anchor rigid arms, and wherein the anchoring arms is shorter that the cantilever arm. In some embodiments, the anchoring arms are at least three times shorter than the cantilever arm. In some embodiments, the piezoelectric plate comprises a ceramic piezoelectric material. In some embodiments, the ceramic piezoelectric material is lead zirconate titanate (PZT).

In accordance with another embodiment, there is provided a portable electronic device, comprising: a processor; an accelerometer connected to the processor, the accelerometer including a sealed housing having an interior surface which defines a cavity; a piezoelectric sensor located within the sealed housing, the piezoelectric sensor comprising a piezoelectric plate rigidly attached to the interior surface of the sealed housing and having a conductive surface having a first dielectric permittivity; a first mass located within the sealed housing and having a conductive surface having a second dielectric permittivity, the first mass being attached to the interior surface of the sealed housing in proximity to the conductive surface of the piezoelectric plate to produce a Casimir effect between the conductive surface of the first mass and the conductive surface of the piezoelectric plate which causes a proportional force to be exerted on the piezoelectric plate when the first mass accelerates; and voltage detection circuitry connected to the opposite sides of the piezoelectric plate which detects and measures electrical output of the piezoelectric plate in terms of a voltage generated by forces exerted on the piezoelectric plate; wherein the processor is configured for receiving electrical output from the voltage detection circuitry.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 1:
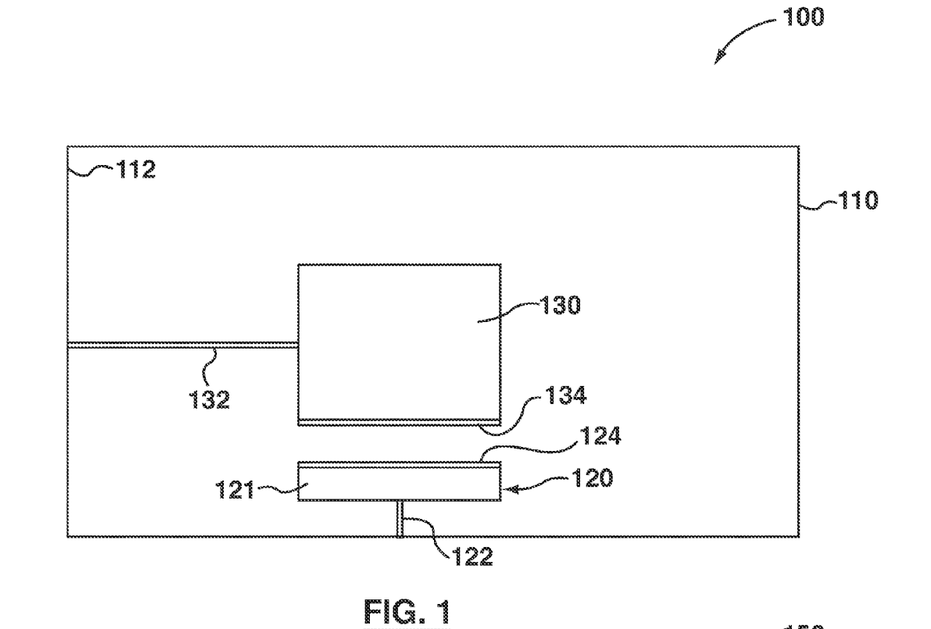
FIG. 1 is a block diagram of a one-axis accelerometer in accordance with one example embodiment of the present disclosure.

Referring now to FIG. 1, one embodiment of a one-dimensional accelerometer 100 in accordance with the present disclosure will be described. The accelerometer 100 comprises a sealed housing 110, a piezoelectric sensor 120 and a moveable mass 130. The piezoelectric sensor 120 senses motion in one direction. For a multidirectional accelerometer in accordance with other embodiments of the present disclosure, the accelerometer includes multiple piezoelectric sensors 120.

The sealed housing 110 has an interior surface 112 which defines a cavity in which the piezoelectric sensor 120 and the mass 130 are located. The sealed housing 110 contains a vacuum. A perfect vacuum may not achievable within the sealed housing 110, thus, any reference to a vacuum in the present disclosure is intended to include a near vacuum.

The piezoelectric sensor 120 comprises a piezoelectric plate 121 formed of a piezoelectric material. The piezoelectric material should have good piezoelectric properties and, in some embodiments, is a ceramic piezoelectric material such as PZT. In other embodiments, the piezoelectric material may be tungsten, bismuth or other suitable piezoelectric material. The piezoelectric plate 121 of the piezoelectric sensor 120 has a conductive surface 124 facing the mass 130.

The piezoelectric sensor 120 is located within the sealed housing 110 with the piezoelectric plate 121 rigidly attached to the interior surface 112 of the sealed housing 110. The piezoelectric plate 121 in the shown embodiment is rigidly attached to the interior surface 112 of the sealed housing 110 by one or more anchoring arms 122. The piezoelectric plate 121 may be rigidly attached to the interior surface 112 by a different mechanism in other embodiments. The conductive surface 124, in at least some embodiments, is a smooth or polished, highly-conducting surface 124, such as a gold-plated surface.

The piezoelectric plate 121 is provided with voltage detection circuitry (not shown) attached to opposite sides of the piezoelectric plate 121. The voltage detection circuitry detects and measures the electrical output of the piezoelectric plate 121 in terms of the voltage generated by forces exerted on the piezoelectric material. The voltage is a result of electrical charge build up inside the piezoelectric material which behaves as a static charge. The voltage detection circuitry may comprise an amplifier configured to amplify the voltage as the signal fluctuations are expected to be very small.

The mass 130 comprises a bulk mass having a conductive surface 134 facing the conducting surface 124 of the piezoelectric plate 121 and is attached to the interior surface 112. The size and shape of the surface area of the conductive surface 134 of the mass 130 and the conductive surface 124 on the piezoelectric plate 121 should be the same for maximal (Casimir) effect. Both conductive surface surfaces 124, 134 should also be flat and very smooth for maximal Casimir effect. The Casimir effect manifests between very closely-spaced conductive surfaces directly opposite to each other. Accordingly, the Casimir effect will not be maximally manifested if the conductive surface surfaces 124, 134 are not the same shape and size or are not sufficiently flat and smooth.

Figure 2:
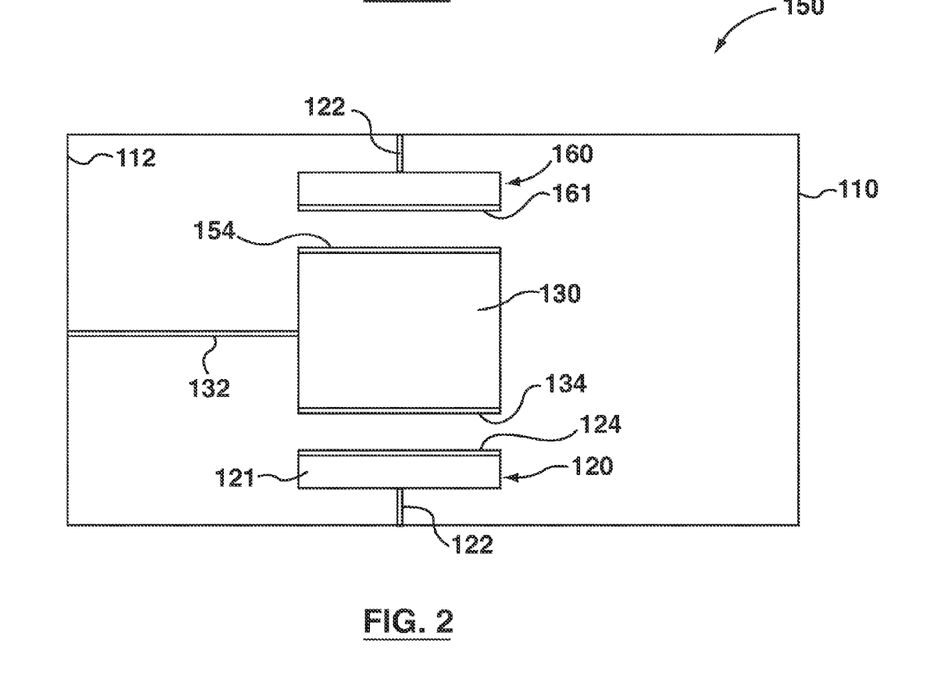
FIG. 2 is a perspective view of a one-axis accelerometer in accordance with another embodiment of the present disclosure.

The mass 130 is shown as a cuboid in FIGS. 1 and 2; however the mass 130 may be a cylinder or other suitable shape in other embodiments. The shape and dimensions of the mass 130 may vary. Smaller dimensions allow for compactness; however, larger dimensions increase the associated Casimir force and the accuracy with which it can be measured/detected. Typically, the smallest useable dimensions will be determined by the sensitivity of the voltage detection circuitry measuring the Casimir forces.

The mass 130, in the shown embodiment, is attached to the interior surface 11 of the sealing housing 110 by a cantilever arm 132. The cantilever arm 132 is configured to position the conductive surface 134 of the mass 130 in a proximity to the conductive surface 124 of the piezoelectric plate 120 sufficient to produce a Casimir effect which causes a proportional force to be exerted on the piezoelectric plate 121 when the mass 130 accelerates. The conductive surface 134 of the mass 130 is very close to but spaced apart from the conductive surface 124 of the piezoelectric plate 120. The cantilever arm 132 may be fixedly attached to the interior surface 112 as in the shown embodiment. The cantilever arm 132 has sufficient rigidity to prevent motion past a certain angle to prevent the mass 130 from touching the piezoelectric plate 121 even under strong, sudden acceleration. The cantilever arm 132 may be formed of the same material as the sealing housing 110. In other embodiments, the cantilever arm 132 may be pivotably attached to the interior surface 112, for example, using a hinge or a ball joint. Different attachment mechanisms for the mass 130 from those described above could alternatively be used.

The anchoring arm 122 is shorter that the cantilever arm 132. In some embodiments, the cantilever arm 133 is three times the length of the anchoring arm 122. In some embodiments, two anchoring arms 122 are used to attach each piezoelectric sensor providing increased stiffness. The mass 130 can be expected to undergo a greater displacement (i.e., movement) than the piezoelectric plate 122 because the cantilever arm 132 is longer and less rigid than the anchoring arm 122.

In the shown embodiment the mass 130 is a cuboid. In other embodiments, the mass 130 is a cylinder and the piezoelectric plate 121 is parallel to a longitudinal axis of the cylinder. Other shapes for the mass 130 are also possible so long as a Casimir Effect can still be generated with a matching piezoelectric plate.

A Casimir force is exerted on the piezoelectric plate 121 as a result of the presence of parallel conducting plates provided by the conductive surface 134 on the mass 130 and the conductive surface 124 on the piezoelectric plate 121 itself. The Casimir force may be attractive when the sealing housing 110 contains a vacuum and the parallel conducting surfaces have the same dielectric permittivity constants or repulsive when the sealing housing 110 contains an immersion liquid and the parallel conducting surfaces have different dielectric permittivity constants. The amount of the Casimir Force can be calculated using equation (1) given above given the static plate gap (i.e., the distance between the conductive plates when at rest and not in motion) and the surface area of the conductive plates.

The plate gap and surface area varies between embodiments. The plate gap is in the order of atomic distances or microns (µm), for example, the plate gap may range from several microns to several hundredths of a micron or less. A typical range is from approximately 1 µm to approximately 0.01 µm. The surface area of the conductive plates is typically less than 100 but not less than 1 mm². A typical range surface area is 8 or to 10 mm².

When the inter-plate distance (i.e., plate gap) is 1 µm and the plate is 8 mm×8 mm resulting in a surface area of 64 mm², this results in a Casimir force of:

$$F_c = Ahc_0\pi/480\,d^4$$
$$= (64.0 \times 10^{-6})(6.24 \times 10^{-25})/4.8 \times 10^{-22}$$
$$= 8.32 \times 10^{-8} N$$

When the inter-plate distance is reduced to 0.01 µm and the plate surface area is increased to 10 mm², this results in a Casimir force of:

$$F_c = Ahc_0\pi/480\,d^4$$
$$= (1 \times 10^{-5})(6.24 \times 10^{-25})/4.80 \times 10^{-30}$$
$$= 1.3 N$$

In a rest position of the accelerometer 100, the conductive surface 124 of the piezoelectric plate 121 is parallel to the conductive surface 134 on the mass 130. When more than one piezoelectric plate is provided, the conductive surface of each piezoelectric plate is parallel to the matching conductive surface on the first or second mass when the rest position.

When the sealing housing 110 is accelerated through space, for example when incorporated in a host electronic device, the mass 130 at the cantilever arm 132 will be subject to movement, for example, in a circular, linear and/or or elliptic directions. The relative displacement will be in a direction opposite to a direction of the motion. The exact locus of the movement will depend on the nature/direction of the acceleration and on the length and rigidity/elasticity of the cantilever arm 132. The movement of mass 130 causes fluctuations in the plate gap, resulting in fluctuations in the Casimir force. These force fluctuations create pressure on the piezoelectric plate 121, which in turn produces voltage fluctuations across the piezoelectric plate 121. These voltage fluctuations are detected by the sensor circuitry attached to the sides of piezoelectric plate 121.

The minimum achievable plate gap is limited by the roughness of the conductive surfaces. Generally, the smoother the surface the smaller the minimum plate gap which is achievable. The maximum plate surface area is limited by the physical dimensions of the seal housing and/or portable electronic device in which the plates and cavity are carried. The plate surface area should be as large as reasonably possible while still fitting with the cavity of the sealed housing 110 with, in turns, needs to fit within the host portable electronic device. While a plate surface area of 8 mm×8 mm has been described as one example, the dimensions may be varied.

The piezoelectric plate 121 is configured to operate in a transverse mode in which external pressure or force (i.e., the Casimir force) is applied along one axis of the piezoelectric material with the resulting electric field in the piezoelectric material being generated along an axis perpendicular to the external pressure or force. This allows the voltage detection circuitry to be conveniently placed on the adjacent sides of the piezoelectric plate 121 perpendicular to the conductive surface 124 (i.e., to non-Casimir related plate surfaces). This avoids interference with the active Casimir surfaces so as not to disturb the quantum field on the active Casimir surfaces and is the position which coincides with the direction of maximal field strength. In a longitudinal mode of the piezoelectric plate, the resulting electric field would manifest in a direction parallel to the Casimir force so the detection circuitry would have to be placed directly on the active Casimir surfaces for signal detection which may interfere with the active Casimir surfaces and the quantum field. Because the conductive plates have to be placed facing each other in very close proximity, the tiny inter-plate distances required to effectively generate a Casimir force may be more readily achieved by a configuration in which the piezoelectric plate 121 is configured to operate in the transverse mode.

The piezoelectric plate 121 is used to measure acceleration in one direction perpendicular to the piezoelectric plate 121. Referring now to FIG. 2, an embodiment of a one-dimensional accelerometer 150 which measures acceleration in opposite directions perpendicular to the piezoelectric plate 121 will be described. The accelerometer 150 is similar to the accelerometer 100, but further includes second conductive surface 154 on the mass 130 opposite to the conductive surface 134. The accelerometer 150 also includes a second piezoelectric sensor 160 attached to the interior surface 112 of the sealed housing 110 similar to the piezoelectric sensor 120. The second piezoelectric sensor 160 comprises a piezoelectric plate 161 formed of a ceramic piezoelectric material such as PZT and has a conductive surface 164 facing the second conductive surface 154 of the mass 130. The piezoelectric plates 121, 161 collectively form a pair of parallel piezoelectric plates with one of the piezoelectric plates 121, 161 on each side of the mass 130 aligned to form a first axis. This provides a one-axis accelerometer for measuring one-dimensional acceleration in opposite directions along the first axis defined by the pair of parallel piezoelectric plates.

A two-axis accelerometer for measuring two-dimensional acceleration may be provided by using a second pair of piezoelectric sensors (not shown) attached to the interior surface 112 of the sealed housing 110 each having a conductive plate on each side of the mass 130 to form a second pair of parallel piezoelectric plates with one of the piezoelectric plates on each side of the mass 130. The piezoelectric plates in the second pair of parallel piezoelectric plates are aligned with each other and orthogonal to the first pair of piezoelectric plates to form a second axis orthogonal to the first axis. Each plate in the second pair of piezoelectric sensors faces further conductive surfaces (not shown) of the mass 130.

A three-axis accelerometer for measuring three-dimensional acceleration may be provided by using a second moveable mass (not shown) attached to the interior surface 112 of the sealed housing 110 in a direction orthogonal to the first moveable mass 130 described above. The three-axis accelerometer also includes a third pair of piezoelectric sensors (not shown) attached to the interior surface 112 of the sealed housing 110 each having a conductive plate on each side of the second mass aligned to form a third axis orthogonal to the first axis and second axis. Each plate in the third pair of piezoelectric sensors faces conductive surfaces (not shown) of the second mass. The second mass is attached the sealed housing 110 by a second cantilever arm (not shown) in a direction orthogonal to the first cantilever arm 132. The second cantilever arm is configured to position the second mass in a proximity to the conductive surfaces of the piezoelectric plates of the third pair of piezoelectric sensors sufficient to produce a Casimir effect which causes a proportional force to be exerted on the piezoelectric plates of the third pair of piezoelectric sensors when the second mass accelerates.

Each of the pairs of piezoelectric sensors provides a sensing axis for measuring one of X-axis, y-axis and z-axis acceleration. As noted above, the pairs of piezoelectric sensors are mutually orthogonal to measure three-dimensional acceleration in the form of X-axis, y-axis and z-axis acceleration. The particular sensing axis provided by a particular pair of piezoelectric sensors depends on the orientation of the pairs of piezoelectric sensors within the host electronic device. Each piezoelectric sensor in a pair of piezoelectric sensors measures acceleration in one direction of the X-axis, y-axis or z-axis so that each pair of piezoelectric sensors measures acceleration in both directions of the X-axis, y-axis or z-axis.

The three-axis accelerometer uses a second mass because measurements in three dimensions cannot be taken from a single mass alone. The attachment mechanism for attaching the mass to the interior surface 112 of the sealed housing, the cantilever arm 132 in the shown described embodiments, physically obstructs measurements in three dimensions. Accordingly, a combination of two masses is used to measure three-dimensional motion: a first mass having two sets of (orthogonal) conductive plates and a second mass having a single set of conductive plates.

In embodiments having an attractive mode of operation, the conductive surface 124 on the piezoelectric plate 121 and the conductive surface 134 on the mass 130 have the same dielectric permittivity constant and are typically the same. In some embodiments, the conductive surface 124 on the piezoelectric plate 121 and the conductive surface 134 on the mass 130 is a gold surface such as a gold-plated surface. The gold-plating of the conductive surface 124 on the piezoelectric plate 121 and the conductive surface 134 on the mass 130 has a thickness of approximately 2000 Ångstroms or more in some embodiments.

In embodiments having a repulsive mode of operation, the cavity contains an immersion liquid and the parallel conducting surfaces have different dielectric permittivity constants. In some embodiments, the conductive surface 124 on the piezoelectric plate 121 has a silica surface such as a silica-plated surface rather than a gold surface. The silica-plating has a thickness which is at least as thick as the inter-plate distance or gap between the parallel conducting plates. To minimize any extra mass/weight on the piezoelectric plate, in some embodiments the silica-plating has a thickness no more than twice the inter-plate distance, typically twice the inter-plate distance. For example, for an inter-plate gap of 10 µm, the silica should between 10 µm and 20 µm thick, typically 20 µm. The immersion liquid is typically a chemically inert liquid (e.g., non-reactive liquid) selected to have a dielectric permittivity which is lower than the conductive surface on the mass 130 (e.g., gold) and higher than the conductive surface on the piezoelectric plate 121 (e.g., silica). Examples of suitable immersion liquids include, but are not limited to, bromobenzene, ethanol and p-Xylene.

Figure 3:
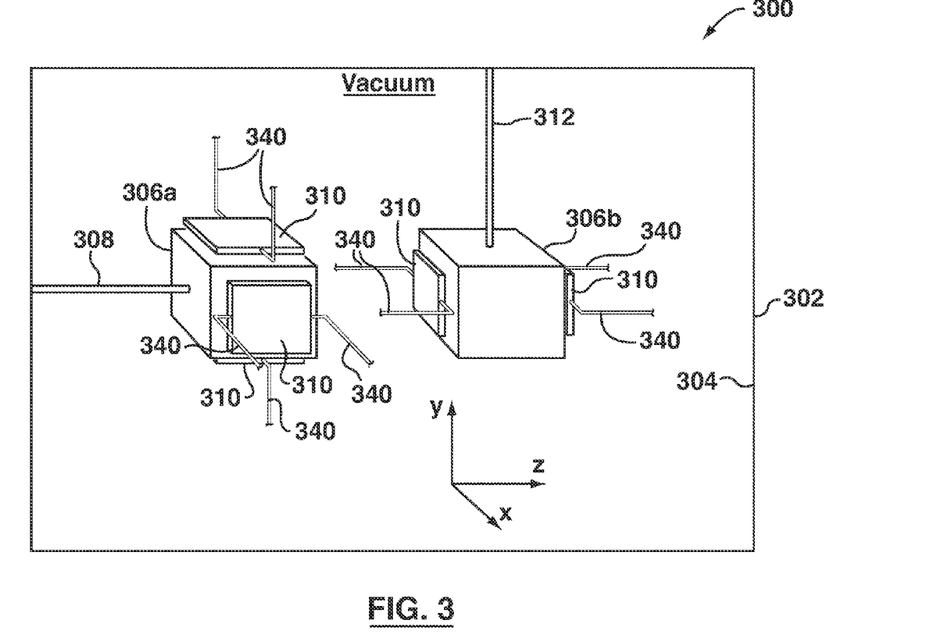
FIG. 3 is a perspective view of a three-axis accelerometer in accordance with one embodiment of the present disclosure.

Referring now to FIG. 3, one embodiment of a three-axis accelerometer 300 in accordance with the present disclosure will be described. The accelerometer 300 comprises a sealed housing 302 having an interior surface 304 which contains a vacuum. A first mass 306*a* is rigidly attached to the interior surface 304 of the sealed housing 302 using a first cantilever arm 308. A second mass 306*b* is rigidly attached to the interior surface 304 using a second cantilever arm 312 in a direction orthogonal to the first cantilever arm 308. Two short rigid anchoring arms (not shown) attached each piezoelectric plate 310 to the interior surface 304 of the sealed housing 302.

Detection of the directional accelerations is effected by the length differences of the anchoring arms relative to the cantilever arms. The anchoring arms are short, rigid bars whereas the cantilever arms connected each gold-plated conductive nodes to the interior surface 304 of the sealed housing 30 is narrower and longer. A configuration having a relative long narrow cantilever arm relative to the anchoring arms may amplify vibrations of the cantilever arm caused by motion. In some embodiments, the cantilever arms may be approximately 3 times longer than the anchoring arms as well as being narrower. In other embodiments, similar-length or same-length structures may be used.

The first mass 306a and second mass 306b are each gold-plated and form a cuboid in the shown embodiment. The first mass 306a and second mass 306b provide two gold-plated conductive nodes sometimes referred to as Casimir cubes or Casimir nodes. The gold-plated surface of the first mass 306a and second mass 306b has a thickness of approximately 2000 Ångstroms or more in some embodiments. A sufficiently thick gold-plating assists in providing a more optimum Casimir Effect as the phenomenon is affected by the skin depth of the metallic surface. Two pairs of piezoelectric sensors 310, referred to as the first and second pair of piezoelectric sensors 310, are attached to the interior surface 304 of the sealed housing 302 about the first mass 306a. The two pairs of piezoelectric sensors 310 are not attached to the first mass 306a but are spaced apart from the first mass 306a at a distance suitable for generating a Casimir effect. A third pair of parallel piezoelectric plates 310 is attached to the interior surface 304 of the sealed housing 302 about the second mass 306a. The third pair of piezoelectric sensors 310 is not attached to the second mass 306b but is spaced apart from the second mass 306b at a distance suitable for generating a Casimir effect. The three-pairs of piezoelectric sensors 310 are typically positioned at the same distance away from the conductive surfaces of the first and second masses 306a, 306b.

Each piezoelectric sensor 310 comprises a piezoelectric plate formed of a ceramic piezoelectric material such as PZT and has a gold-plated surface which faces the gold-plated of surface first mass 306a. The gold-plated surface of the piezoelectric plate has a thickness of approximately 2000 Ångstroms or more in some embodiments. The conductive plates of the piezoelectric sensors 310 flat, smooth and/or polished and are each oriented parallel to a conductive surface face of one the two gold-plated conductive nodes.

Each piezoelectric sensor 310 also has a voltage detection circuitry 340 attached to opposite sides of the respective piezoelectric plate. The voltage detection circuitry 340 detects and measures the electrical output of the respective piezoelectric plate in terms of the voltage generated by forces exerted on the piezoelectric material. The voltage is a result of electrical charge build up inside the piezoelectric material which behaves as a static charge. The voltage detection circuitry may comprise an amplifier configured to amplify the voltage as the signal fluctuations are expected to be very small.

The accelerometer 300 may be a digital accelerometer provided in an integrated circuit (IC) having a processor (not shown) and memory (not shown) connected to the processor memory such as Electrically Erasable Programmable Read-Only Memory (EEPROM) or flash memory, and analog-to-digital (A/D) converter for converting voltage received from the voltage detection circuitry 340 to a digital value. The processor may be a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 102. The IC may also comprise an amplifier configured to amplify the signal from the voltage detection circuitry 340, typically only when a suitable amplifier is not part of the voltage detection circuitry 340. The processor may be configured to execute instructions stored in the memory for a method of calculating acceleration based on the electrical outputs from the voltage detection circuitry 340 and output the acceleration values to the processor of a host electronic device.

The piezoelectric plates of the first pair of piezoelectric sensors 310 form a first pair of parallel piezoelectric plates with one of the piezoelectric plates on each side of the first mass 306a aligned to form a first axis. The first pair of piezoelectric sensors measures acceleration in opposite directions along the first axis defined by the first pair of parallel piezoelectric plates. The piezoelectric plates of the second pair of piezoelectric sensors form a second pair of parallel piezoelectric plates with one of the piezoelectric plates on each side of the first mass 306a. The second pair of parallel piezoelectric plates is orthogonal to the first pair of piezoelectric plates to form a second axis orthogonal to the first axis. The second pair of piezoelectric sensors measures acceleration in opposite directions along the second axis defined by the second pair of parallel piezoelectric plates.

Accelerations of the sealing housing 302 will produce physical displacement of each metallic node relative to its adjacent piezoelectric plates, the relative displacement being in a direction opposite to the direction of the motion. The first cantilever arm 308 is configured to position the first mass 306a in a proximity to the pair of parallel piezoelectric plates of the first and second pairs of piezoelectric sensors 120 sufficient to produce a Casimir effect which causes a proportional force to be exerted on the pair of parallel piezoelectric plates when the first mass 306a accelerates.

The piezoelectric plates of the third pair of piezoelectric sensors 310 form a third pair of parallel piezoelectric plates with one of the piezoelectric plates on each side of the second mass 306b aligned to form a third axis. The third pair of piezoelectric sensors 310 measures acceleration in opposite directions along the third axis defined by the third pair of parallel piezoelectric plates. The second cantilever arm 312 is configured to position the second mass 306b in a proximity to the pair of parallel piezoelectric plates of the third pair of piezoelectric sensors 120 sufficient to produce a Casimir effect which causes a proportional force to be exerted on the pair of parallel piezoelectric plates when the second mass 306b accelerates.

The piezoelectric plates of the piezoelectric sensors 310 are configured to operate in a transverse mode in which external pressure or force (i.e., the Casimir force) is applied along one axis of the piezoelectric material with the resulting electric field in the piezoelectric material being generated along an axis perpendicular to the external pressure or force.

The accelerometer 300 has large matching surface areas on the piezoelectric plate and masses. This is made possible because the piezoelectric plates and masses both possess planar and parallel Casimir conducting surfaces. This can result in a relatively large Casimir Force, Fc. Obtaining "perfect" parallel orientations of conductive plates and cuboid surfaces places can be difficult which places a limit to the closeness of the surfaces that can be achieved without the conductive plates touching at a corner or edge, etc. This consequently creates an upper limit to the sensitivity as the Casimir conducting surfaces cannot be brought arbitrarily close.

Figure 4:
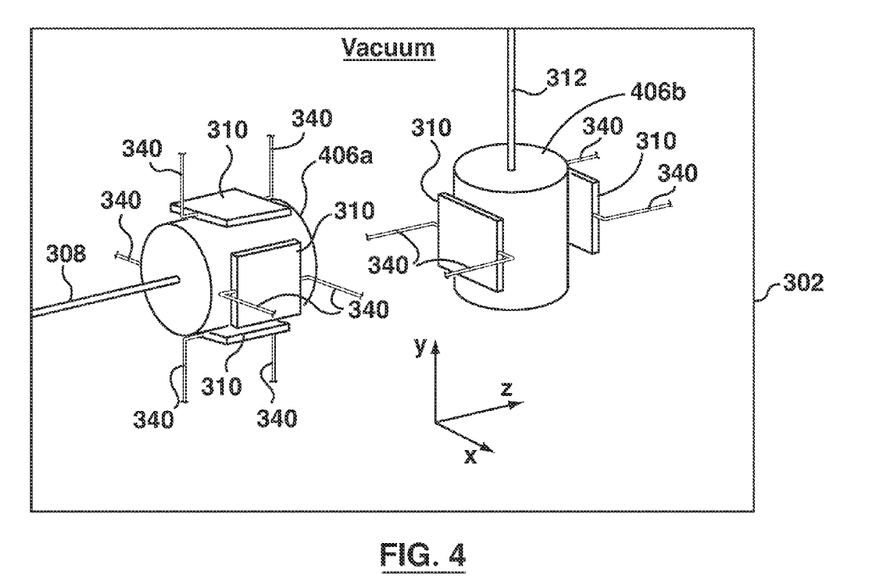
FIG. 4 is a perspective view of a three-axis accelerometer in accordance with one example embodiment of the present disclosure.

Referring now to FIG. 4, another embodiment of a three-axis accelerometer 400 in accordance with the present disclosure will be described. The accelerometer 400 is similar to the accelerometer 300 described above except that the first mass 406a and second mass 406b, and therefore the gold-plated conductive nodes, are cylindrical rather than cuboid. The conductive surface of the 406a and second mass 406b which is paired with the gold-plated piezoelectric plate of the piezoelectric sensors 310 to create a Casimir effect is the tangential surface of the cylindrical masses 406a, 406b opposite the piezoelectric sensors 310. This means that the conductive surface on the masses 406a, 406b is a relatively-narrow strip on the cylindrical surface of the masses 406a, 406b. As the cylindrical surface of the masses 406a, 406b curves away from the gold-plated surface of the piezoelectric plate, the location of the smallest inter-plate distance and the maximum Casimir force, the Casimir effect weakens as it degrades with inter-plate distance.

An advantage of using cylindrical gold-plated nodes and gold-plated piezoelectric plates is that it does not require any parallel plate alignments because the conductive surface of each of the conductive masses is cylindrical as opposed to planar, and therefore the conductive surface of the piezoelectric plates can be brought arbitrarily close to the masses cylindrical surface without worrying about two-dimensional alignment. However, one-dimensional parallel-ness is still required, i.e. along the direction of the principal axis of each cylinder. Smaller surface gaps produce a larger Casimir Force and, therefore, increase sensitivity to motion. The accelerometer 400 is also easier to calibrate, i.e. adjust the plate gaps between the Casimir surfaces. However, the lack of parallel reaction surfaces results in smaller matching surface areas. The matching surface area is generally a narrow rectangular strip of width x instead of a rectangular area having sides x as in the accelerometer 300. The smaller effective area may limit the measurable Casimir Force, and hence the device sensitivity.

The accelerometers 300 and 400 use four conductive surfaces of the first mass and two conductive surfaces of the second mass. Each of the conductive surfaces of the first and second mass are associated with a conductive surface on a piezoelectric plate of a respective piezoelectric sensor 310. Thus, the six conductive surfaces of the first and second mass are matched with conductive surfaces on a piezoelectric plate of a respective piezoelectric sensor 310.

Figure 5:
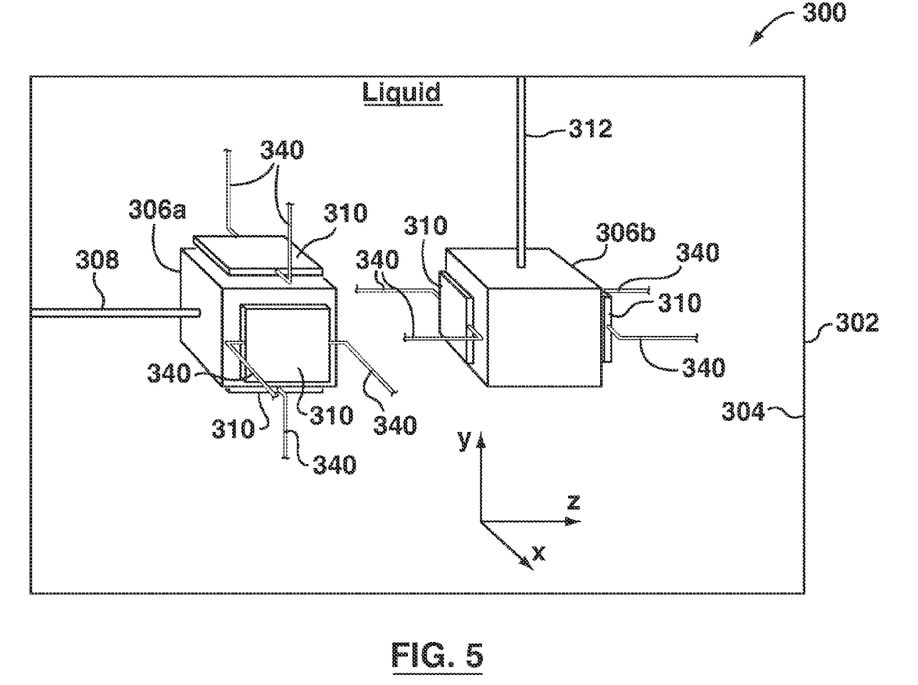
FIG. 5 is a perspective view of a three-axis accelerometer in accordance with one example embodiment of the present disclosure.

Referring now to FIG. 5, a further embodiment of a three-axis accelerometer 500 in accordance with the present disclosure will be described. The accelerometer 500 is similar to the accelerometer 300 described above except that the piezoelectric plates are plated or coated in silica instead of gold, and the vacuum is replaced with an immersion liquid of appropriate dielectric permittivity. Although the masses 306a, 306b in the shown embodiment are cuboids, in other embodiments cylindrical masses 406a, 406b such as that of the accelerometer 400 or another suitable shape can be used.

The silica-plating have a thickness which is at least as thick as the inter-plate distance or gap between the parallel conducting plates. To minimize any extra mass/weight on the piezoelectric plates, in some embodiments the silica-plating has a thickness no more than twice the inter-plate distance, typically twice the inter-plate distance. For example, for an inter-plate gap of 10 μm, the silica should between 10 μm and 20 μm thick, typically 20 μm.

In a repulsive mode of operation used to generate a repulsive Casimir force, each of the parallel conducting surfaces in a plate pair have different dielectric permittivity constants (e.g., gold for one plate, silica for the other), and the immersion liquid has an appropriate dielectric permittivity. The immersion liquid, in at least some embodiments, is a chemically inert liquid (e.g., non-reactive liquid) which is selected to have a dielectric permittivity which is lower than the conductive surface on the masses 306a, 306b (e.g., gold) and higher than the conductive surface on the piezoelectric plates (e.g., silica). Examples of suitable immersion liquids include, but are not limited to, bromobenzene ($C_6H_5Br$), ethanol and p-Xylene. The relationship between the dielectric constants of gold, silica and bromobenzene has been shown to produce the desired repulsive Casimir effects.

The accelerometer 500, unlike the accelerometers 300 and 400, generates a repulsive Casimir force between the parallel conducting plates. An advantage of the repulsive Casimir force is it reduces or eliminates the tendency of conductive surfaces to stick together in response to an attractive Casimir force. Nevertheless, the "sticking" phenomenon is unlikely to be problematic for the accelerometers 300 and 400 due to the fairly large plate gaps and fairly small plate areas even though it is often an issue for nanomachine parts and devices.

The accelerometer 500 uses gold-plated cuboid nodes rather than cylindrical nodes as in the accelerometer 500. This has the advantage that it uses the larger surface areas associated with rectangular plates as opposed to cylindrical surfaces. However, more materials are used in the construction of the accelerometer 500 relative to the accelerometers 300 and 400.

Figure 6:
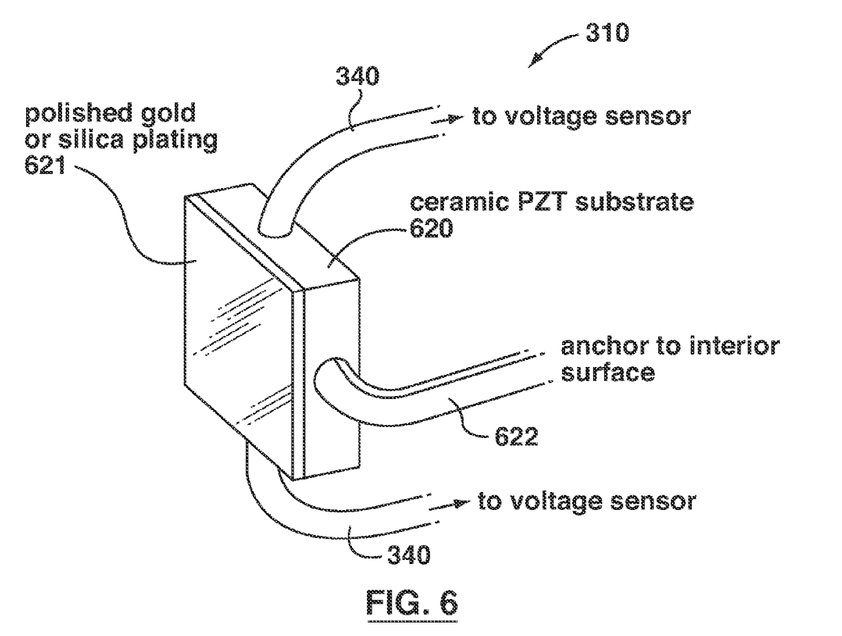
FIG. 6 is a perspective view of a piezoelectric sensor in accordance with one example embodiment of the present disclosure.

Referring now to FIG. 6, one embodiment of a piezoelectric sensor 310 in accordance with the present disclosure will be described. The piezoelectric plate includes a ceramic PZT substrate 620 and a polished gold or silica plating 621 attached to one surface the ceramic PZT substrate 620, depending on the embodiment. The plating 621 has a flat, smooth, polished gold or silica surfaces and is oriented parallel to a conductive face of a moveable mass secured within the sealed housing. As described above, when the plating 621 is formed of gold the gold-plating may be 2000 Å thick in some embodiments. When the plating 621 is formed of silica, the silica-plating may have a thickness no more than twice the inter-plate distance, typically twice the inter-plate distance. For example, for an inter-plate gap of 10 μm, the silica should between 10 μm and 20 μm thick, typically 20 μm.

Leads of the voltage detection circuitry 340 attach to opposite sides of the ceramic PZT substrate 620 perpendicular to the plating 621. A pair of rigid anchor arms 622 is attached to opposite sides of the ceramic PZT substrate 620 in the shown embodiment. In other embodiments, the rigid anchor arms 622 could be attached to a back of the ceramic PZT substrate 620 opposite the plating 621. In such embodiments, the anchor arms 622 would attach to a surface aligned in the same direction as the incident pressure (i.e., behind the plate), however, the presence of the anchor arms 622 is unlikely to adversely affect the pressure reading and may improve the pressure reading because the anchor arms 622 provide a supportive surface along the direction of pressure.

Figure 7:
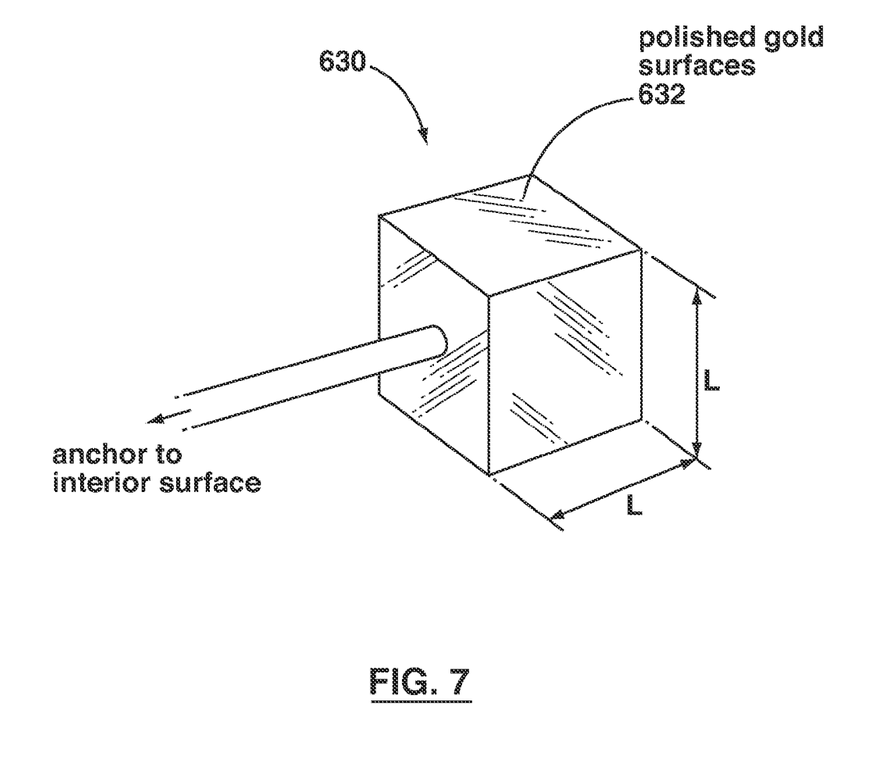
FIG. 7 is a perspective view of a cuboid node in accordance with one example embodiment of the present disclosure.

Referring now to FIG. 7, one embodiment of a cuboid conductive node 630 in accordance with the present disclosure will be described. The cuboid node 630 comprises a cuboid mass of suitable weight. Each side of the cuboid mass is gold-plated in the shown embodiment; however, only the Casimir surfaces require gold-plating. From a manufacturing standpoint, it may be easier to plate the entire surface of the cuboid mass; however, to save costs only the Casimir surfaces may be gold-plated in some embodiments. The gold-plated surface 632 of the cuboid node 630 has a thickness of approximately 2000 Ångstroms or more in some embodiments. A sufficiently thick gold-plating assists in providing a more optimum Casimir Effect as the phenomenon is affected by the skin depth of the metallic surface.

Calibration

Force measurements along individual sensing axes of the accelerometers of the present disclosure are calibrated in order to normalize the three-dimensional acceleration readings in a similar manner to conventional accelerometer. X-axis, y-axis and z-axis acceleration sensors may have different sensitivities (i.e., signal amplifications) also referred to as scale factors. Sensitivity error is the difference between the ideal 1 g output and the 1 g output reported. Each measurement axis has a scale factor or sensitivity, typically measured in volts per g (V/g) or volts per mg (V/mg) which represents the change in the voltage output proportional to the change in g. Each accelerometer has an ideal scale factor; however, the actual change in output in response to changes in g may differ from the ideal output. This may be due to a variety of reasons, including differences in inter-plate distances (i.e., the ceramic plate-to-central node gap distances) created during the manufacturing process. The possibility that differences exist in the inter-plate distances requires calibration because the Casimir Force, Fc, is dependent upon the inter-plate gaps, being proportional to the reciprocal of the fourth power of the inter-plate gaps. Therefore, unequal gaps for different axial plates will lead to incorrect readings for the relative strengths of the axial accelerations. To correct for sensitivity, a sensitivity of each piezoelectric sensor may be determined during calibration, stored in memory of the accelerometer or host electronic device, and used to correct measured acceleration.

The motion sensitivity of accelerometers of the present disclosure may be controlled by varying the following properties: the length of the cantilever arm (longer arms will produce greater motion at the mass or node), the width of the cantilever arm (narrower arms will produce greater motion sensitivity), and the size of the mass/node (more massive nodes will produce greater motion sensitivity).

The mass/node may sometimes oscillate immediately after the initial motion ceases. These oscillations will occur at the resonant frequency of the mass-arm/node-arm structure. This oscillation "noise" may be filtered out by filtering the voltage output by the piezoelectric sensors through a band-stop filter centred on the resonant frequency. The direction of an acceleration vector can then be determined by examining the filtered voltage outputs from all piezoelectric sensors. Without such filtering, two acceleration vectors (the desired vector and its noise vector) will be produced under oscillation.

Alternatively, instead of a band-stop filter, a low-pass filter with a cut-off frequency slightly below the resonant frequency of the mass-arm/node-arm structure, can be applied to the voltage fluctuations to eliminate the noise. This results from both the resonant frequency of the mass/node and the resonant frequency of the piezoelectric plates. The resonant frequency of the piezoelectric plates is expected to be higher than the resonant frequency of the mass/node since the piezoelectric plates are anchored with greater rigidity and on shorter arms. This alternative arrangement imposes an upper limit to the detectable frequencies of oscillatory motion sensitivity because all high frequency motion will be masked by the low-pass filter. However, for many applications this restriction may not present an issue.

The performance of ceramic piezoelectric materials such as lead zirconate titanate (PZT) can degrade over time, shortening the operational lifetime of ceramic piezoelectric materials. A study has shown that high-intensity unipolar driving signals operated on PZT films in transverse mode can withstand billions of unipolar signal cycles with limited resulting degradation in its piezoelectric parameters: Ronald G. Polcawich, Cheng-Ning Feng, Stewart Kurtz, Steve Perini, Paul J. Moses, Susan, Trolier-McKinstry, "AC and DC Electrical Stress Reliability of Piezoelectric Lead Zirconate Titanate (PZT) Thin Films", The International Journal of Microcircuits and Electronic Packaging, Volume 23, Number 1, First Quarter 2000, which is incorporated herein by reference. The accelerometers of the present disclosure involve low-intensity unipolar driving forces in transverse mode the results of the degradation study appear to be applicable. Nonetheless, the accelerometers of the present disclosure may be designed as single, compact, removeable units which can be switched out and replaced should performance of the accelerometers degrade.

Even where not explicitly described, the accelerometers of the present disclosure may take the form of a digital accelerometer comprising at least a processor (not shown) and a memory (not shown) connected to the processor. The processor may be configured to execute instructions stored in the memory for a method of calculating acceleration based on the electrical outputs from the piezoelectric sensors or voltage detection circuitry 340.

While the accelerometers 300, 400 and 500 are three-axis accelerometers, a two-axis accelerometer for measuring two-dimensional acceleration may be constructed based on any of the accelerometers 300, 400 and 500 described above by removing the second mass and the third pair of piezoelectric sensors 310 associated with it. Similarly, a one-axis accelerometer for measuring one-dimensional acceleration may be constructed based on any of the accelerometers 300, 400 and 500 described above by removing the second pair of piezoelectric sensors 310.

Figure 8:
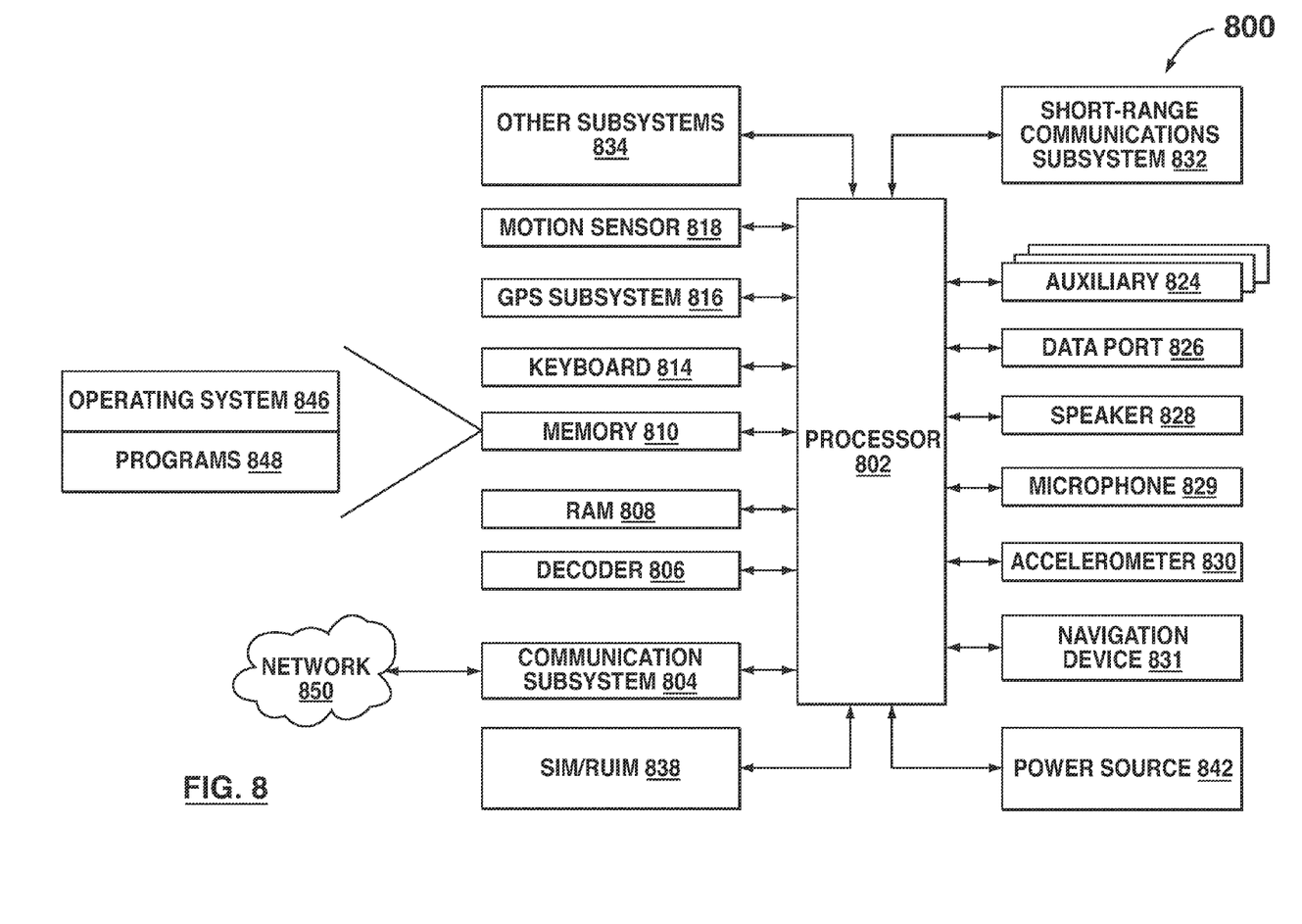
FIG. 8 is a simplified block diagram of components including internal components of an electronic device suitable for carrying out example embodiments of the present disclosure.

A block diagram of an example of a portable electronic device 800 is shown in FIG. 8. The portable electronic device 800 includes multiple components, such as a processor 802 that controls the overall operation of the portable electronic device 800. Communication functions, including data and voice communications, are performed through a communication subsystem 804. Data received by the portable electronic device 800 is decompressed and decrypted by a decoder 806. The communication subsystem 804 receives messages from and sends messages to a wireless network 850. The wireless network 850 may be any type of wireless network, including, but not limited to, data wireless networks, voice wireless networks, and networks that support both voice and data communications. A power source 842, such as one or more rechargeable batteries or a port to an external power supply, powers the portable electronic device 800.

The processor 802 interacts with other components, such as Random Access Memory (RAM) 808, memory 810, a display screen 812 (such as a liquid crystal display (LCD), a keyboard 814, a GPS (Global Positioning System) subsystem 816 including a GPS receiver (not shown), one or more motion sensors 818, one or more auxiliary input/output (I/O) subsystems 824, a data port 826, a speaker 828, a microphone 829, an accelerometer 830 in accordance with any of the above-described embodiments, a navigation device 831, a short-range communications subsystem 832, and other device subsystems 834. The keyboard 814 may use any suitable switch construction including, but not limited to, a membrane keyboard, dome-switch keyboard, scissor-switch keyboard, capacitive keyboard, mechanical-switch keyboard, buckling-spring keyboard, Hall-effect keyboard, laser keyboard, roll-up keyboard, or transparent keyboard. A keypad may be provided instead of a keyboard in other embodiments.

In some embodiments, the display screen 812 may be provided with a touch-sensitive overlay (not shown) operably connected to an electronic controller (not shown) to form a touch-sensitive display. The touch-sensitive display may have any number of user-selectable features rendered thereon, for example, in the form of virtual buttons for user-selection of for example, applications, options, or onscreen keys of an onscreen (or virtual) keyboard for user entry of data during operation of the electronic device 800.

To identify a subscriber for network access, the portable electronic device 800 uses a Subscriber Identity Module or a Removable User Identity Module (SIM/RUIM) card 838 for communication with a network, such as the wireless network 850. Alternatively, user identification information may be programmed into memory 810.

The portable electronic device 800 includes an operating system 846 and software applications or programs 848 that are executed by the processor 802 and are typically stored in a persistent, updatable store such as the memory 810. Additional applications or programs 848 may be entered into the portable electronic device 800 through the wireless network 850, auxiliary I/O subsystem(s) 824, data port 826, short-range communications subsystem 832, or any other suitable subsystem 834. When the accelerometer 830 is analog, the memory 810 includes machine-readable instructions for calculating acceleration based on electrical output input from the accelerometer 830. The processor 802 executes the machine-readable instructions to calculate acceleration which may be used by the operating system 846 and/or applications 848 as input. Depending on the acceleration input, the operating system 846 and/or applications 848 may perform operations causing changes to the state of the portable electronic device 800, including but not limited to a change in the operational state or a change in the content displayed on the display screen 812.

A received signal such as a text message, an e-mail message, or web page download is processed by the communication subsystem 804 and input to the processor 802. The processor 802 processes the received signal for output to the display 812 and/or to the auxiliary I/O subsystem 824. A subscriber may generate data items, for example e-mail messages, which may be transmitted over the wireless network 850 through the communication subsystem 804. For voice communications, the overall operation of the portable electronic device 800 is similar. The speaker 828 outputs audible information converted from electrical signals, and the microphone 830 converts audible information into electrical signals for processing.

The present disclosure may be embodied in other specific forms without departing from its spirit or essential characteristics. The described embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. An accelerometer, comprising:
a sealed housing having an interior surface which defines a cavity;
a piezoelectric sensor located within the sealed housing, the piezoelectric sensor comprising a piezoelectric plate rigidly attached to the interior surface of the sealed housing and having a conductive surface having a first dielectric permittivity;
a first mass located within the sealed housing and having a conductive surface having a second dielectric permittivity, the first mass being attached to the interior surface of the sealed housing in proximity to the conductive surface of the piezoelectric plate to produce a Casimir effect between the conductive surface of the first mass and the conductive surface of the piezoelectric plate which causes a proportional force to be exerted on the piezoelectric plate when the first mass accelerates;
voltage detection circuitry connected to opposite sides of the piezoelectric plate which detects and measures electrical output of the piezoelectric plate in terms of a voltage generated by forces exerted on the piezoelectric plate.

2. The accelerometer of claim 1, wherein the first mass is attached to the interior surface of the sealed housing by a cantilever arm.

3. The accelerometer of claim 2, wherein the piezoelectric plate is attached to the interior surface of the sealed housing by two or more anchor rigid arms and wherein the anchoring arms are shorter than the cantilever arm.

4. The accelerometer of claim 3, wherein the anchoring arms are at least three times shorter than the cantilever arm.

5. The accelerometer of claim 4, wherein the piezoelectric material is lead zirconate titanate (PZT).

6. The accelerometer of claim 1, wherein the first dielectric permittivity and second dielectric permittivity are the same.

7. The accelerometer of claim 6, wherein the cavity comprises a vacuum.

8. The accelerometer of claim 6, wherein the conductive surface of the first mass and the conductive surface of the piezoelectric sensor comprises a gold-plating.

9. The accelerometer of claim 8, wherein the gold-plating has a thickness of approximately 2000 Ångströms.

10. The accelerometer of claim 1, wherein the first dielectric permittivity and second dielectric permittivity are different.

11. The accelerometer of claim 10, wherein the cavity comprises an immersion liquid, wherein the immersion liquid is a chemically inert liquid which is selected to have a dielectric permittivity which is higher than the first dielectric permittivity of the conductive surface of the piezoelectric plate and lower than the second dielectric permittivity of the conductive surface of the mass.

12. The accelerometer of claim 11, wherein the immersion liquid is one of bromobenzene, ethanol or p-Xylene.

13. The accelerometer of claim 1, wherein the conductive surface of the first mass comprises a gold-plating and the conductive surface of the piezoelectric sensor a silica-plating.

14. The accelerometer of claim 13, wherein the cavity comprises an immersion liquid, wherein the immersion liquid is a chemically inert liquid which is selected to have a dielectric permittivity which is lower than the gold-plating of the mass and higher than the silica-plating of the piezoelectric plate.

15. The accelerometer of claim 14, wherein the immersion liquid is one of bromobenzene, ethanol or p-Xylene.

16. The accelerometer of claim 1, comprising a first pair of piezoelectric sensors rigidly attached to the interior surface of the sealed housing, each of the piezoelectric sensors in the first pair of piezoelectric sensors including a piezoelectric plate having a conductive surface having the first dielectric permittivity, the conductive surfaces of the piezoelectric plates in the first pair of piezoelectric sensors being located on opposite sides of the first mass so as to face a conductive surface on the first mass, the conductive surfaces of the piezoelectric plates in the first pair of piezoelectric sensors being aligned in parallel so to form a first axis, the first pair of piezoelectric sensors measuring acceleration in opposite directions along the first axis defined by the parallel piezoelectric plates of the first pair of piezoelectric sensors;
wherein the first mass is in proximity to the conductive surfaces of the first pair of piezoelectric sensors to produce a Casimir effect between the conductive surface of the first mass and the conductive surfaces of the first pair of piezoelectric sensors which causes a proportional force to be exerted on the piezoelectric plates of the first pair of piezoelectric sensors when the first mass accelerates.

17. The accelerometer of claim 16, further comprising a second pair of piezoelectric sensors rigidly attached to the interior surface of the sealed housing oriented orthogonal to the first pair of piezoelectric sensors, each of the piezoelectric sensors in the second pair of piezoelectric sensors including a piezoelectric plate having a conductive surface having the first dielectric permittivity, the conductive surfaces of the piezoelectric plates in the second pair of piezoelectric sensors being located on opposite sides of the first mass so as to face a conductive surface on the first mass, the conductive surfaces of the piezoelectric plates in the second pair of piezoelectric sensors being aligned in parallel so to form a second axis orthogonal to the first axis, the second pair of piezoelectric sensors measuring acceleration in opposite directions along the first axis defined by the parallel conductive surfaces of the second pair of piezoelectric sensors;

wherein the first mass is in proximity to the conductive surfaces of the second pair of piezoelectric sensors to produce a Casimir effect between the conductive surface of the first mass and the conductive surfaces of the second pair of piezoelectric sensors which causes a proportional force to be exerted on the piezoelectric plates of the second pair of piezoelectric sensors when the first mass accelerates.

18. The accelerometer of claim 17, further comprising:
a second mass located within the sealed housing and having a conductive surface having the second dielectric permittivity, the second mass being attached to the interior surface of the sealed housing; and
a third pair of piezoelectric sensors rigidly attached to the interior surface of the sealed housing oriented orthogonal to the first pair and second of piezoelectric sensors, each of the piezoelectric sensors in the third pair of piezoelectric sensors including a piezoelectric plate having a conductive surface having the first dielectric permittivity, the conductive surfaces of the piezoelectric plates in the third pair of piezoelectric sensors being located on opposite sides of the second mass so as to face a conductive surface on the second mass, the conductive surfaces of the piezoelectric plates in the third pair of piezoelectric sensors being aligned in parallel so to form a third axis orthogonal to the first axis and second axis, the third pair of piezoelectric sensors measuring acceleration in opposite directions along the third axis defined by the parallel conductive surfaces of the third pair of piezoelectric sensor;

wherein the second mass is in proximity to the conductive surfaces of the third pair of piezoelectric sensors to produce a Casimir effect between the conductive surface of the second mass and the conductive surfaces of the third pair of piezoelectric sensors which causes a proportional force to be exerted on the piezoelectric plates of the third pair of piezoelectric sensors when the second mass accelerates.

19. The accelerometer of claim 1, further comprising an amplifier configured to amplify the electrical output received from the piezoelectric plate.

20. The accelerometer of claim 1, further comprising a processor configured to calculating acceleration based on electrical output from the one piezoelectric plate.

21. The accelerometer of claim 1, wherein the piezoelectric plate operates in transverse mode and electrical contacts for the voltage detection circuitry are connected to the piezoelectric plate at opposite sides of the piezoelectric plate, perpendicular to the conductive surface of the piezoelectric plate.

22. The accelerometer of claim 1, wherein the first mass is a cuboid.

23. The accelerometer of claim 1, wherein the first mass is a cylinder and the piezoelectric plate is oriented parallel to a longitudinal axis of the cylinder.

24. A portable electronic device, comprising:
a processor;
an accelerometer connected to the processor, the accelerometer including:
a sealed housing having an interior surface which defines a cavity;
a piezoelectric sensor located within the sealed housing, the piezoelectric sensor comprising a piezoelectric plate rigidly attached to the interior surface of the sealed housing and having a conductive surface having a first dielectric permittivity; a first mass located within the sealed housing and having a conductive surface having a second dielectric permittivity, the first mass being attached to the interior surface of the sealed housing in proximity to the conductive surface of the piezoelectric plate to produce a Casimir effect between the conductive surface of the first mass and the conductive surface of the piezoelectric plate which causes a proportional force to be exerted on the piezoelectric plate when the first mass accelerates; and
voltage detection circuitry connected to opposite sides of the piezoelectric plate which detects and measures electrical output of the piezoelectric plate in terms of a voltage generated by forces exerted on the piezoelectric plate;
wherein the processor is configured for receiving electrical output from the voltage detection circuitry.

25. The portable electronic device of claim 24, wherein the cavity comprises an immersion liquid, wherein the immersion liquid is a chemically inert liquid which is selected to have a dielectric permittivity which is higher than the first dielectric permittivity of the conductive surface of the piezoelectric plate and lower than the second dielectric permittivity of the conductive surface of the mass.

26. An accelerometer, comprising:
a sealed housing having an interior surface which defines a cavity;
a piezoelectric sensor located within the sealed housing, the piezoelectric sensor comprising a piezoelectric plate rigidly attached to the interior surface of the sealed housing and having a conductive surface having a first dielectric permittivity;
a first mass located within the sealed housing and having a conductive surface having a second dielectric permittivity, the first mass being attached to the interior surface of the sealed housing in proximity to the conductive surface of the piezoelectric plate to produce a Casimir effect between the conductive surface of the first mass and the conductive surface of the piezoelectric plate which causes a proportional force to be exerted on the piezoelectric plate when the first mass accelerates;
wherein the cavity comprises an immersion liquid, wherein the immersion liquid is a chemically inert liquid which is selected to have a dielectric permittivity which is higher than the first dielectric permittivity of the conductive surface of the piezoelectric plate and lower than the second dielectric permittivity of the conductive surface of the mass.

* * * * *